Nov. 10, 1936.  W. J. PEARMAIN  2,060,379
CLUTCH
Filed Sept. 10, 1931   2 Sheets-Sheet 1

Inventor
William J. Pearmain
By Rector, Hibben, Davis & Macauley Attys.

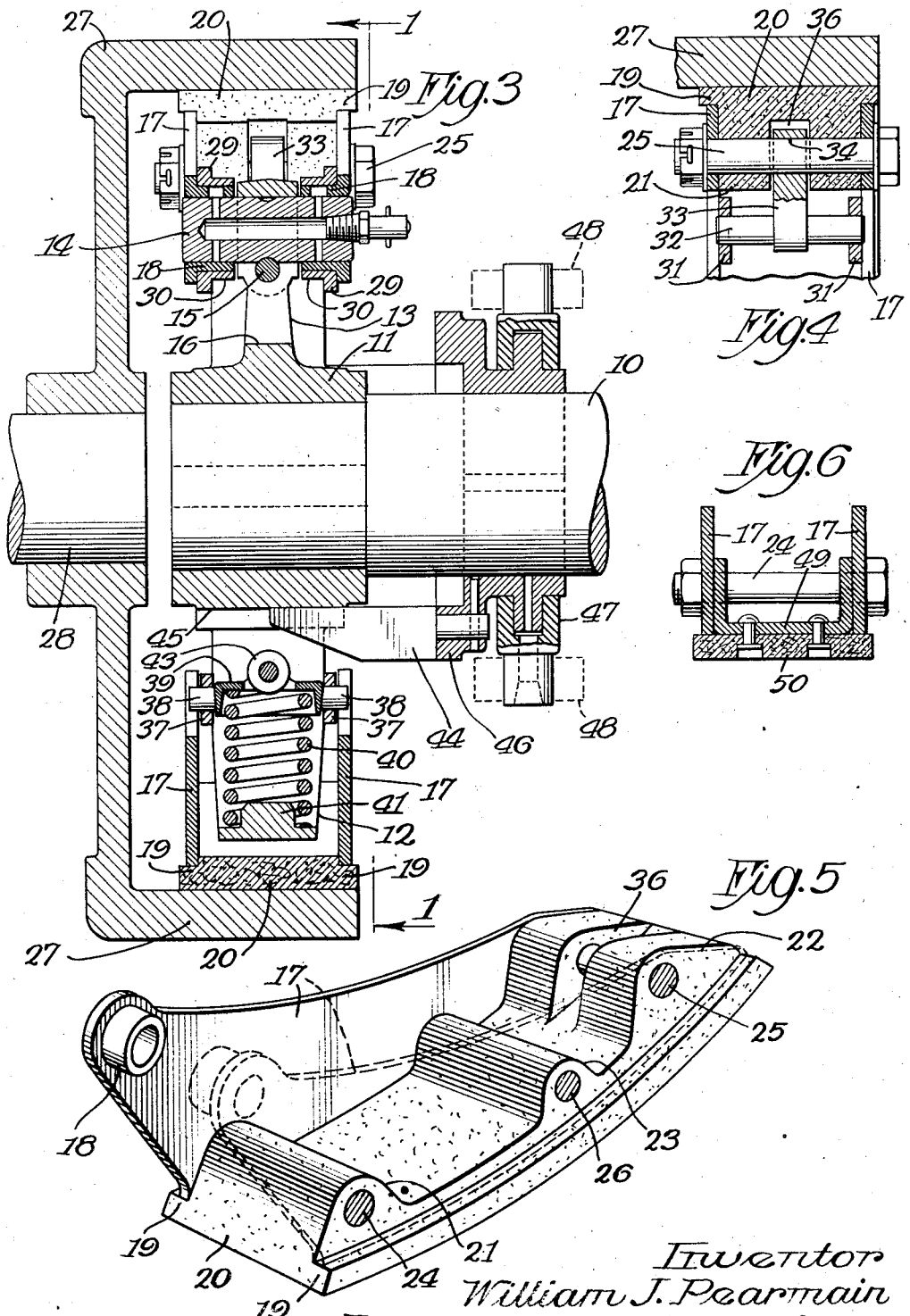

Patented Nov. 10, 1936

2,060,379

UNITED STATES PATENT OFFICE 2,060,379

CLUTCH

William J. Pearmain, Racine, Wis., assignor to Twin Disc Clutch Company, Racine, Wis., a corporation of Wisconsin Application September 10, 1931, Serial No. 562,014

17 Claims. (Cl. 192—75)

My invention relates to clutches of the internally expanding type and more particularly to a device of this character employing one or more shoes which are adapted for frictional contact with a cooperating part, such as a drum.

One object of my invention is to devise a clutch which is characterized by a provision for automatically compensating for the wear of the friction elements, effecting a gradual repositioning of the clutch shoes as wear occurs within definite limits, the parts being adapted to thereafter establish a new initial position of the shoes, followed by an automatic compensation for wear subsequent to this new positioning.

A further object is to devise a clutch of the character indicated in which the automatic compensation for wear may be effected through a single setting of the several parts, or the wear allowance may be divided into several steps so as to maintain the travel of the sliding sleeve or other part, which normally serves as a releasing medium for the clutch, within practical limits.

A further object is to provide a clutch in which the friction elements are so associated therewith as to enable their easy renewal without disturbing the clutch on its shaft, or by requiring its removal or withdrawal from the coacting member or drum.

A further object is to devise a clutch which is capable of using a friction element in the form of a molded block that is clamped between side plates, said block being preferably formed of an asbestos compound or other material that is characterized by a high resistance to wear, while at the same time effectively resisting the disintegrating influence of heat.

A further object is to provide a clutch of the internal expanding type having a plurality of shoes which, together with their associated parts, are symmetrically disposed around the shaft, so that the clutch is adapted for running in either direction by a simple arrangement of the several parts.

A further object is to provide an internally expanding clutch in which the shoes are partially counterbalanced in order to somewhat lessen the extent of releasing force required to withdraw the shoes from engaging positions, the tendency of the shoes being normally to swing outwardly under centrifugal force and thus creating additional friction of the contacting faces.

These and further objects of my invention will be set forth in the following specification, reference being had to the accompanying drawings and the novel means by which said objects are effectuated will be definitely pointed out in the claims.

In the drawings:

Fig. 3 is a further sectional view of the clutch as viewed along the line 3—3 in Fig. 1, looking in the direction of the arrows.

Fig. 4 is a detailed sectional view along the line 4—4 in Fig. 1, looking in the direction of the arrows and showing the connection between one of the clutch shoes and its accompanying adjusting link.

Fig. 5 is a perspective view of one of the clutch shoes including its supporting side plates, one of the side plates being shown dotted in order to more clearly illustrate the conformation of the inner side of the shoe.

Fig. 6 is a sectional view of a modified form of shoe, corresponding to the shoe shown in the lower part of Fig. 3.

Figure 1:
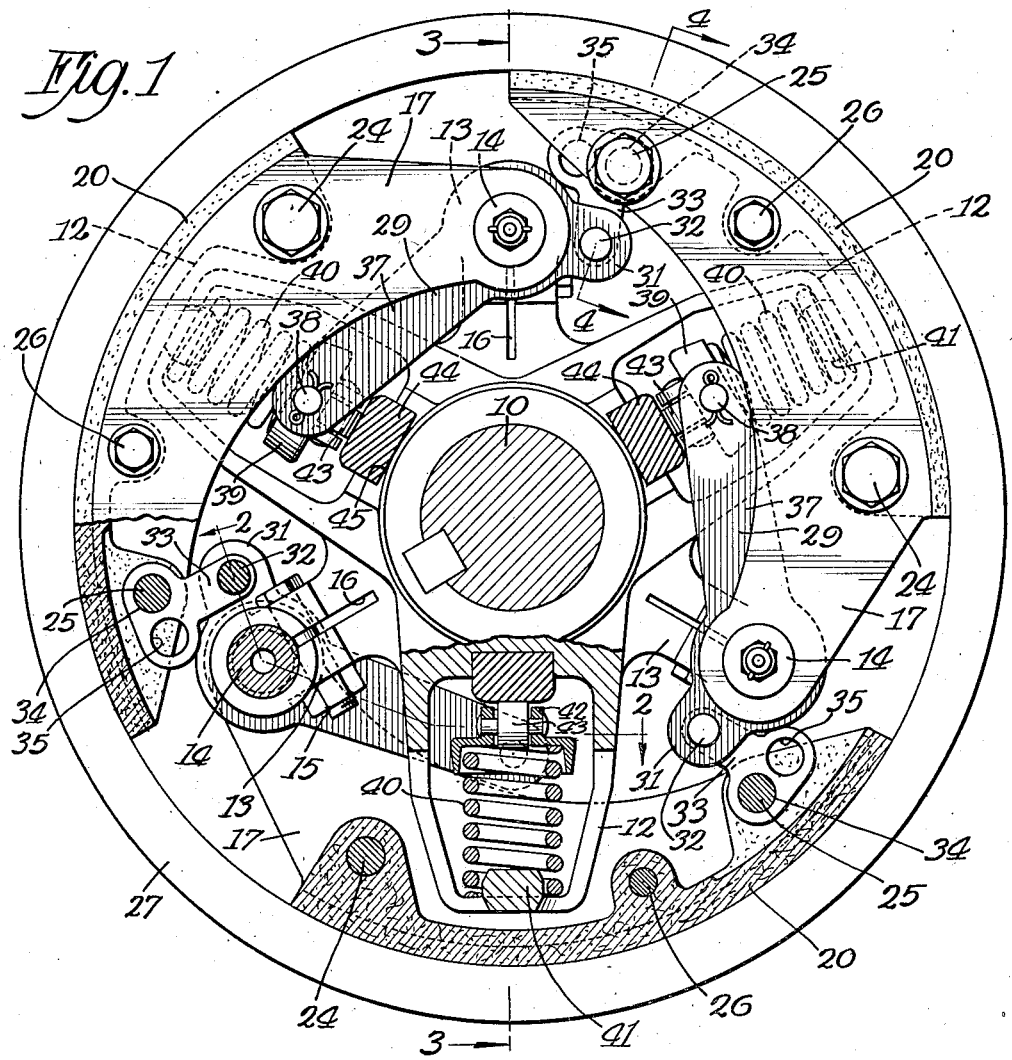
Figure 1 is a sectional view of my improved clutch taken generally along the line 1—1 in Fig. 3, looking in the direction of the arrows.

Referring more particularly to Figs. 1 and 3, the numeral 10 designates a shaft which may be considered as the driving or driven element of the clutch, dependent upon the conditions of operation and the manner in which the clutch shoes, hereinafter described, are placed. Keyed or otherwise secured to the end of the shaft 10 is a hub 11 and projecting radially from and equi-spaced therearound is a plurality of spring cages 12. A plurality of arms 13 also project from the hub 11 in alternating relation to the cages 12, said arms and cages being either formed integrally with said hub, or they may be formed as separate parts and attached thereto.

The end of each arm 13 is apertured to receive a pivot pin 14 which projects on opposite sides of its corresponding arm and is clamped in position by means of a bolt 15, a portion of said arm being slit as at 16 in order to facilitate the clamping action. A pair of shoe side plates 17 is journaled on the extremities of the pin 14 through the medium of cylindrical shoulders 18 which are formed on said plates and project toward each other and the adjacent arm 13. Each pair of side plates 17 projects away from the associated pin 14 and their extremities are curved to closely fit shoulders 19 formed on a friction shoe block 20 which may be formed of asbestos compound or any suitable material and is preferably molded. The length and width of each block 20 will depend upon the extent of friction surface required, as will the selection of the material composing said block. The inner side of each block 20 is provided with a heel boss 21, a toe boss 22 and an intermediate boss 23, all of which are apertured to receive corresponding bolts 24, 25 and 26, respectively, by means of which the side plates 17 are secured thereto to serve as supporting members therefor. From the foregoing, it will be understood that the block 20 and the side plates 17 comprise a clutch shoe which is freely swingable upon the pin 14 into an engaging position with the inner surface of a drum 27, constituting the other principal member of the clutch and which is properly secured to the shaft 28. Moreover, the spring cages not only extend between the side plates 17, but also into the depression between the bosses 21 and 23, thereby lessening the diameter of the clutch.

By reason of the symmetrical disposition of the arms 13 around the hub 11, each of the clutch shoes is correspondingly placed within the drum 27, which feature possesses particularly advantage in enabling the clutch shoes to be reversed in position in order to enable the clutch to be operated in either direction. In order to maintain the shoes in engaging position with the drum and to withdraw the same therefrom to a released position, the following instrumentalities are employed, it being understood that the same elements are employed for each shoe so that it is only necessary to describe the same in connection with a single shoe.

Figure 2:
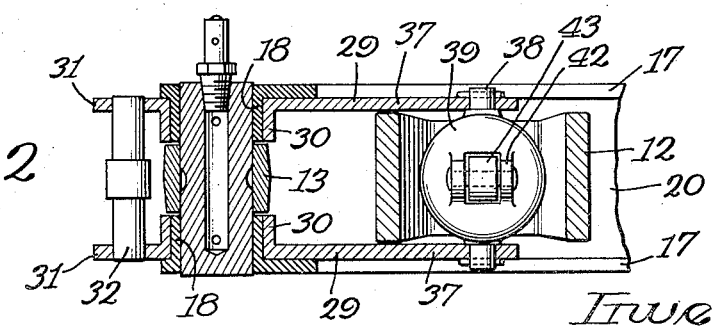
Fig. 2 is a sectional view taken along the irregular line 2—2 in Fig. 1, looking in the direction of the arrows and showing the relation of the spring or releasing lever to the adjacent portions of the clutch.

Referring to Figs. 1, 2 and 3, a pair of spring levers 29 are journaled on the cylindrical shoulders 18 in spaced disposition on opposite sides of the arm 13 through the medium of cylindrical shoulders 30 each of which is formed integral with an associated lever. Each lever is provided with an arm 31 which extends in a clockwise direction from the adjacent pin 14 and has pivotal connection through a pin 32 with the inner end of an adjusting link 33. The outer end of said link, or that end which is closer to the inner surface of the drum 27, is enlarged and provided with adjusting holes 34 and 35, the former being closer to the pin 32 for a purpose hereinafter explained. The enlarged end of the link 33 is received within a slot 36 provided in the boss 22 and, for the position of the parts shown, the bolt 25 is located in the hole 34.

The other arm 37 of each lever 29 is somewhat longer than the arm 31 and extends in a counter-clockwise direction from the associated pin 14. The extremities of the indicated arms are apertured to pivotally receive trunnion pins 38 formed on a spring cup 39 which is disposed within the cage 12. The depression in the cup 39 faces outwardly toward the drum 27 to receive one end of a spiral spring 40, the opposite end of which abuts against the top of the cage, being centered in position by an appropriate boss 41. The opposite side of the cup 39 is provided with a pair of spaced ears 42, between which is placed a roller 43, thus presenting, for the design shown in Fig. 1, a total of three rollers 43 which are equi-spaced around the hub 11 and face theretoward. Since the cages 12 are fixed in position, the tendency of the springs 40 to extend in length causes a rocking of each pair of spring levers 29 in a counter-clockwise direction around the pivot pins 14, thus exerting pressure upon the associated clutch shoes and forcing the same into frictional engagement with the drum 27.

In order to compress the springs 40, thereby rocking the levers 29 in the opposite direction and withdrawing the clutch shoes from engaging position, a plurality of wedges 44 are slidably mounted in grooves 45 formed in the hub 11 and said wedges are carried by a sleeve 46 which is slidable upon the shaft 10. Said sleeve in turn carries a collar 47 which may be actuated by a suitable fork 48, shown dotted in Fig. 3.

The operation of my improved clutch and the manner of releasing the same will now be described:

As shown in Figs. 1 and 3, the clutch shoes are in engaging position with the drum 27, the hub 11 operating in a clockwise direction for the arrangement of shoes as shown. In such position, the extending pressure of the springs 40 maintains a continuous pressure against the clutch shoes, thus serving to retain the latter in proper engaging position with the drum. This maintenance of pressure may obtain throughout the possible movement of the clutch shoes, as determined by the wear allowance of the block 20. In the present instance, however, this total movement is divided into two steps by reason of the particular conformation of the adjusting links 33. Under these conditions, when the block 20 has become worn to a predetermined extent, the bolt 25 will be withdrawn and the links 33 repositioned to place the holes 35 thereof into alignment with the bolt holes in the block 20. Owing to the increased distance of each hole 35 from the lever arms 31, relative to the holes 34, this readjustment of the links 33 will result in placing the springs 40 in their original position, so that they are capacitated for again exerting pressure against the clutch shoes until the blocks have been worn to a further extent.

According to the foregoing arrangement, therefore, the springs 40 are enabled to automatically compensate for wear of the blocks 20, taking up such wear as the same occurs and always maintaining the shoes in adequate, frictional contact with the drum 27.

In releasing the clutch, it is only necessary to move the sleeve 46 towards the left, as viewed in Fig. 3, thus exerting an outward, radial pressure on the spring cups 39 and rocking the levers 29 in a clockwise direction to thereby withdraw the clutch shoes from engagement with the drum 27. The purpose of dividing the wear allowance of the blocks into two steps, as above described, may now be more clearly understood. By so doing, it is possible to keep the travel of the sleeve 46 within practical limits, as might not be otherwise possible if the springs 40 were permitted to extend until the blocks 20 had become fully worn. However, it will be understood that this particular feature of my clutch is largely dependent upon the character of the design and the nature of the working conditions.

One of the important advantages of the present clutch construction is the facility with which the blocks 20 may be removed as desired. To do so, the clutch shoes are moved to released position, as above described, and the bolts 25 are then removed. The sleeve 46 is then retracted and, since connections between the levers 29 and the clutch shoes have been broken by the withdrawal of the bolts 25, the springs 40 are free to extend in length, so that the rollers 43 rest in the grooves 45. In this position, the springs 40 are totally inactive. The remaining bolts of the clutch shoes, namely, bolts 24, and 26, can now be removed, thus enabling one of the side plates 17 to be withdrawn, together with the worn clutch block 20. A new clutch block can then be reinserted, followed by a repositioning of the parts above indicated. During this substitution, it will be particularly noted that it is unnecessary to disturb any of the other parts of the clutch and that such repair may be effected without withdrawing the clutch from its working position within the drum 27.

Owing to the symmetrical disposition of the clutch parts, it is entirely possible to operate the clutch in either direction simply by suitably repositioning the several elements thereof. In the arrangement as shown in Fig. 1, the hub 11 is intended to operate in a clockwise direction, but by simply reversing the position of the clutch shoes, together with the spring levers and adjusting links, it will be obvious that the clutch can be operated in a reverse direction. This flexible characteristic, of course, renders the clutch adaptable to a wide variety of conditions. Another important feature of this clutch resides in its capacity for effecting work under conditions wherein the drum 27, for example, might be slightly eccentric to the shaft 10. Owing to the individual mounting of the clutch shoes and their individual actuating and releasing means, each clutch shoe is enabled to swing easily upon its pivot end, accommodating its position to the particular conformation and position of that portion of the drum surface with which it may at the time be coacting. The full, frictional surface of the clutch is therefore at all times active.

By reason of the offset relation of the wear surface of each clutch shoe with respect to its pivot pin, the tendency of each shoe is to swing outwardly under centrifugal force to thereby increase the intensity of its frictional contact with the drum 27 over that which would normally obtain by reason of the pressure exerted by the spring 40. This excessive pressure would require an abnormal releasing force in order to withdraw the shoes to a disengaged position and in order to at least partially solve this difficulty, each shoe is partially counterbalanced through the medium of the spring levers 29 and the spring cup 39. The action of these parts during the rotation of the clutch is in a direction to withdraw the shoes from engaging position with the drum and the intent of the design is such that it is contemplated that the levers and spring cups will so act as to partially compensate for the excess centrifugal load on the shoes, so that the operation of releasing is only very slightly affected by this increased resistance to release.

In Fig. 6 is illustrated a modified type of shoe in which the block 20 is eliminated in favor of a channel section 49 having friction facing 50 riveted to the outside of the base thereof. The sides of the section 49 are apertured to receive the bolts 24, 25, 26, bolt 24 only being shown, whereby the plates 17 clamp the shoe in position.

While I have shown one set of elements and combinations thereof for effectuating my improved clutch, it will be understood that the same is intended for purpose of illustration only and in no wise to restrict my device to the exact forms and structures shown, for many changes may be made therein without departing from the spirit of my invention.

I claim:

1. In a clutch of the internally expanding type having a drum constituting a friction part, the combination of a hub having a plurality of spring cages and pivot pins alternately disposed therearound, a friction shoe and a lever swingably mounted on each of said pins, one arm of each of said levers being connected to that shoe which is mounted on an adjacent pivot pin, a spring carried by each cage for actuating the other lever arm to maintain the connected shoe in contact with said drum, and means for simultaneously actuating all of said levers to withdraw said shoes from contacting position.

2. In a clutch of the internally expanding type having a drum constituting a friction part, the combination of a hub having a plurality of spring cages and pivot pins alternately disposed therearound, a friction shoe and a lever swingably mounted on each of said pins, a link connecting one arm of each of said levers to that shoe which is mounted on an adjacent pivot pin, said link having a plurality of shoe attaching holes providing different distances between said arm and last-named shoe for taking up wear, a spring carried by each cage for actuating the other lever arm to maintain the connected shoe in contact with said drum, and means for simultaneously actuating all of said levers to withdraw said shoes from contacting position.

3. In a clutch of the internally expanding type having a drum constituting a friction part, the combination of a hub having a plurality of spring cages and pivot pins alternately disposed therearound, a friction shoe and a lever swingably mounted on each of said pins, one arm of each of said levers being connected to that shoe which is mounted on an adjacent pivot pin, a spring cup carried by each of said other lever arms, a spring in each cage abutting against the adjacent spring cup for actuating the connected shoe into contact with said drum and for maintaining this condition, and means for simultaneously actuating all of said levers to withdraw said shoes from contacting position.

4. In a clutch of the internally expanding type having a drum constituting a friction part, the combination of a hub having a plurality of spring cages and pivot pins alternately disposed therearound, a friction shoe and a lever swingably mounted on each of said pins, one arm of each of said levers being connected to that shoe which is mounted on an adjacent pivot pin, a spring cup having a roller carried by each of said other lever arms, the spring in each cage abutting against the adjacent spring cup for actuating the connected shoe into contact with said drum and for maintaining this position, and wedge means slidable along said hub and engageable with said rollers to simultaneously actuate all of said levers and withdraw said shoes from contacting position.

5. In a clutch of the internally expanding type having a drum constituting a friction part, the combination of a hub having a plurality of spring cages and pivot pins alternately disposed therearound, a friction shoe and a lever swingably mounted on each of said pins, each shoe being connected at one end thereof to one of said pins, one arm of each of said levers being connected to that shoe which is mounted on an adjacent pivot pin at a point remote from said last named pin, a spring cup carried by each of said other lever arms, a spring in each cage abutting against the adjacent spring cup for actuating the connected shoe into contact with said drum and for maintaining this condition, and means for simultaneously actuating all of said levers to withdraw said shoes from contacting position, said cup and connected lever partially counterbalancing the extra centrifugal load on said shoe.

6. In a clutch of the internally expanding type having a drum constituting a friction part, the combination of a hub having a plurality of pivot pins disposed therearound, a friction shoe and a lever swingably mounted on each of said pins, one arm of each of said levers being connected to that shoe which is mounted on an adjacent pivot pin, springs bearing against the hub and actuating the other lever arms to maintain the connected shoes in contact with said drum, and means for simultaneously actuating all of said levers to withdraw said shoes from contacting position.

7. In a clutch of the internally expanding type having a drum constituting a friction part, the combination of a hub having a plurality of pivot pins disposed therearound, a friction shoe and a lever swingably mounted on each of said pins, a link connecting one arm of each of said levers to that shoe which is mounted on an adjacent pivot pin, said link having a plurality of shoe attaching holes providing different distances between said arm and last-named shoe for taking up wear, springs disposed around said hub for actuating the other lever arms to maintain the connected shoes in contact with said drum, and means for simultaneously actuating all of said levers to withdraw said shoes from contacting position.

8. In a clutch of the internally expanding type having a drum constituting a friction part, the combination of a hub having a plurality of pivot pins disposed therearound, a friction shoe and a lever swingably mounted on each of said pins, a link connecting one arm of each of said levers to that shoe which is mounted on an adjacent pivot pin, said link being adjustable to provide different distances between said arm and last-named shoe for taking up wear, springs bearing against the hub and actuating the other lever arms to maintain the connected shoes in contact with said drum, and means for simultaneously actuating all of said levers to withdraw said shoes from contacting position.

9. In a clutch of the internally expanding type having a drum constituting a friction part, the combination of a hub having a plurality of pivot pins disposed therearound, a friction shoe and a lever swingably mounted on each of said pins, one arm of each of said levers being connected to that shoe which is mounted on an adjacent pivot pin, spring cups carried by said other lever arms in alternating relation to said pins on said hub, a spring seated at one end in each of said cups and connected at the opposite end to said hub for actuating the connected shoe into contact with said drum and for maintaining said position, and wedge means slidable along said hub and engageable with said cups to simultaneously actuate all of said levers and withdraw said shoes from contacting position.

10. In a clutch of the internally expanding type having a drum constituting a friction part, the combination of a hub having a plurality of pivot pins disposed therearound, a friction shoe swingably mounted at one end on each of said pins, a lever swingably mounted intermediate its ends on each of said pins, one arm of each lever being connected to that shoe which is mounted on an adjacent pin at a point remote from said last named pin and the other arm extending in an opposite direction, and a spring interposed between each of said last named arms and said hub and tending to force said shoes into contact with said drum, said last named arms partially counterbalancing the centrifugal load on said shoes.

11. In a clutch of the internally expanding type having a drum constituting a friction part, the combination of a hub having a plurality of spring cages and pivot pins alternately disposed therearound, a friction shoe and a lever swingably mounted on each of said pins, one arm of each of said levers being connected to that shoe which is mounted on an adjacent pivot pin, a spring carried by each cage for actuating the other lever arms to maintain the connected shoe in contact with said drum, said cages projecting within depressions formed within said shoes to thereby lessen the diameter of the clutch, and means for simultaneously actuating all of said levers to withdraw said shoes from contacting position.

12. In a clutch of the internally expanding type having a drum constituting a friction part, the combination of a hub having a plurality of pivot pins disposed therearound, a friction shoe swingably mounted on each of said pins and comprising side plates and a friction member detachably secured thereto, a lever swingably mounted on each of said pins, one arm of each of said levers being connected to that shoe which is mounted on an adjacent pivot pin, springs for actuating the other lever arms to maintain the connected shoes in contact with said drum, and means for simultaneously actuating all of said levers to withdraw said shoes from contacting position, said side plates being removable in the released position of the clutch to permit replacement of said friction members.

13. In a clutch of the internally expanding type having a drum constituting a friction part, the combination of a hub having a plurality of pivot pins disposed therearound, a friction shoe and a lever swingably mounted on each of said pins, one arm of each lever being connected to that shoe which is mounted on an adjacent pin at a point remote from said last-named pin, springs bearing against the hub and actuating the other lever arms to maintain the connected shoe in contact with said drum, said last-named arms being located to partially counterbalance the centrifugal load on said connected shoe.

14. In a clutch of the internally expanding type having a drum constituting a friction part, the combination of a hub having a pair of pivot pins, a friction shoe and a lever swingably mounted on said pins, respectively, a link connecting one arm of said lever to said shoe, said link having a plurality of shoe-attaching holes providing different distances between said arm and shoe for taking up wear, and a spring for actuating the other lever arm to maintain the shoe in contact with the drum.

15. In a clutch of the internally expanding type having a drum constituting a friction part, the combination of a hub having a pair of pivot pins, a friction shoe and a lever swingably mounted on said pins, respectively, a link connecting one arm of said lever to said shoe, said link having a plurality of shoe-attaching holes providing different distances between said arm and shoe for taking up wear and the extended axis of the link being substantially normally disposed to a tangent drawn to the curvature of the shoe at the junction of the axis therewith, and means for actuating the other lever arm to maintain the shoe in contact with the drum.

16. In a clutch of the internally expanding type having a drum constituting a friction part, the combination of a hub having a pair of pivot pins, a friction shoe and a lever swingably mounted on said pins, respectively, one arm of said lever being connected to the shoe, and a spring bearing against the hub and actuating the other lever arm to maintain the shoe in contact with the drum, said last-named arm being located to partially counterbalance the centrifugal load on said shoe.

17. In a clutch of the internally expanding type having a drum constituting a friction part, the combination of a hub having a pair of pivot pins, a friction shoe and a lever swingably mounted on said pins, respectively, a link connecting one arm of said lever to said shoe, said link having a plurality of shoe-attaching holes providing different distances between said arm and shoe for taking up wear, and a spring for actuating the other lever arm to maintain the shoe in contact with the drum, said last-named arm being located to partially counterbalance the centrifugal load on said shoe.

WILLIAM J. PEARMAIN.